(12) United States Patent
Fan et al.

(10) Patent No.: US 8,333,674 B2
(45) Date of Patent: Dec. 18, 2012

(54) DOUBLE COGGED V-BELT FOR VARIABLE SPEED DRIVE

(75) Inventors: Xinjian Fan, Novi, MI (US); Wenlong Lu, Suzhou (CN); Yoshitaka Sato, Nara (JP)

(73) Assignee: The Gates Corporation, Denver, CO (US)

( * ) Notice: Subject to any disclaimer, the term of this patent is extended or adjusted under 35 U.S.C. 154(b) by 0 days.

(21) Appl. No.: 13/448,106

(22) Filed: Apr. 16, 2012

(65) Prior Publication Data

US 2012/0202634 A1    Aug. 9, 2012

Related U.S. Application Data

(62) Division of application No. 12/432,985, filed on Apr. 30, 2009, now Pat. No. 8,206,251.

(51) Int. Cl.
*F16G 1/28* (2006.01)

(52) U.S. Cl. ........................................... 474/205

(58) Field of Classification Search ................... 474/205, 474/238, 242, 249–251, 261, 268
See application file for complete search history.

(56) References Cited

U.S. PATENT DOCUMENTS

| | | | | |
|---|---|---|---|---|
| 1,883,821 A | * | 10/1932 | Reeves | 474/250 |
| 2,062,568 A | * | 12/1936 | Freedlander | 474/265 |
| 2,121,222 A | * | 6/1938 | Freedlander | 474/251 |
| 2,430,500 A | * | 11/1947 | Freedlander et al. | 474/251 |
| 2,775,902 A | * | 1/1957 | Rush | 474/251 |
| 3,338,107 A | * | 8/1967 | Elmer | 474/153 |
| 3,673,883 A | * | 7/1972 | Adams | 474/205 |
| 4,216,679 A | * | 8/1980 | Howerton et al. | 474/238 |
| 4,702,729 A | * | 10/1987 | Tanaka et al. | 474/205 |
| 4,773,895 A | * | 9/1988 | Takami et al. | 474/238 |
| 4,894,048 A | * | 1/1990 | Inukai et al. | 474/240 |
| 4,950,212 A | * | 8/1990 | Masuda et al. | 474/242 |
| 5,273,496 A | * | 12/1993 | White, Jr. | 474/238 |
| 5,415,594 A | * | 5/1995 | Kitahama et al. | 474/263 |
| 5,447,476 A | * | 9/1995 | White, Jr. | 474/238 |
| 5,624,338 A | * | 4/1997 | Kawashima et al. | 474/263 |
| 6,102,823 A | * | 8/2000 | Hosokawa et al. | 474/242 |
| 6,103,349 A | * | 8/2000 | Matsumoto | 428/192 |
| 6,336,885 B1 | * | 1/2002 | Hayashi | 474/263 |
| 6,361,462 B1 | * | 3/2002 | Takada et al. | 474/251 |
| 2005/0113199 A1 | * | 5/2005 | Schoendienst | 474/251 |
| 2008/0261739 A1 | * | 10/2008 | Kanzow et al. | 474/266 |
| 2010/0004084 A1 | * | 1/2010 | Fan et al. | 474/242 |

FOREIGN PATENT DOCUMENTS

| | | | | |
|---|---|---|---|---|
| JP | 61116149 A | * | 6/1986 | |
| JP | 62266250 A | * | 11/1987 | |
| JP | 06257645 A | * | 9/1994 | |
| JP | 2004225804 | * | 8/2004 | |

* cited by examiner

*Primary Examiner* — Thomas B Will
*Assistant Examiner* — Joan D Misa
(74) *Attorney, Agent, or Firm* — P. N. Dunlap, Esq.; J. A. Thurnau, Esq.

(57) ABSTRACT

A double-cogged V-belt with the upper and lower cog profiles symmetric and having lines ("L") and arcs ("A") connected according to a sequence from the center of a root to the center of an adjacent cog of L1-A1-L2-A2-L3 for the upper profile and A3-L5-A4-L6, and with at least one upper root and one lower root substantially aligned with each other, and with the sum of the length of L1 plus the radius of A1 equal to or within 20% of the radius of A3. The upper and lower pitches may be equal and all the roots aligned, or there may be more upper cogs than lower cogs. Some or all arcs and lines may be connected tangentially.

26 Claims, 5 Drawing Sheets

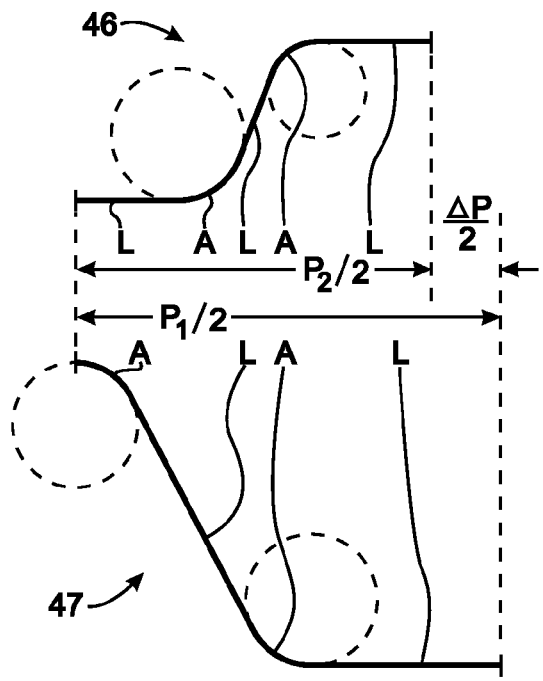
FIG. 6
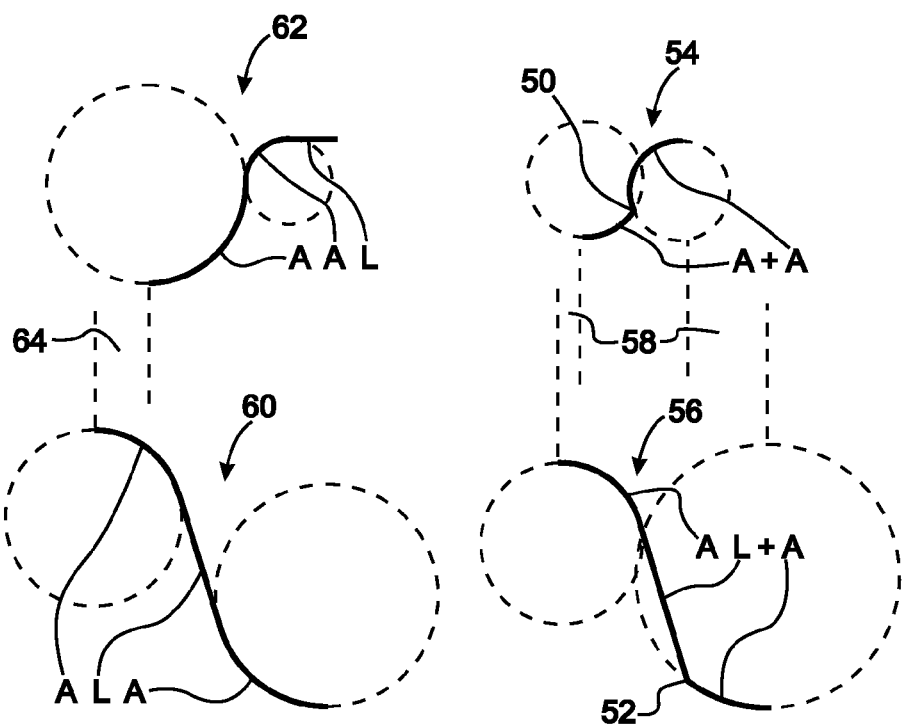
FIG. 7
PRIOR ART
FIG. 8
PRIOR ART

DOUBLE COGGED V-BELT FOR VARIABLE SPEED DRIVE

BACKGROUND OF THE INVENTION

1. Field of the Invention

This invention relates generally to a double-cogged V-belt, more particularly to a double-cogged V-belt with aligned upper and lower cogs having a particular combination of cog profiles, and specifically such a V-belt adapted for a variable speed transmission.

2. Description of the Prior Art

The belt plays an important role in the operation of variable speed power transmission systems or drives, such as used in scooters, motorcycles, snowmobiles, all-terrain vehicles, cars and industrial applications. In one exemplary design of variable speed transmission ("VST"), the belt is a flexible element which connects two pairs of sheaves through friction to transmit power from the driving shaft to the driven shaft. Each pair of sheaves includes a fixed sheave and a movable sheave. By controlling the axial movement of movable sheaves, the speed and torque ratio may be changed. During operation, the belt sustains extreme longitudinal tension and bending and transverse compression. To achieve maximum performance, efficiency, and durability, one of the main challenges the belt design faces is meeting contradictory requirements, namely high longitudinal flexibility but high transverse stiffness while maintaining proper side contact. The general approach to this challenge has been to form alternating thick and thin sections on one or both sides of the belt, known as cogs or teeth, and roots, also known as valleys, grooves or notches, respectively. Cogs are intended to provide the thickness and stiffness needed for transverse stiffness, while the roots or notches are intended to provide the needed longitudinal bending flexibility. Cogs may be formed or applied on the inside or lower side of the belt, or cogs may be applied to the outside, i.e., the backside or upper side of the belt. Alternately, cogs may be applied to both the lower and upper side of the belt, resulting in a double-cogged belt.

The challenge for conventional V-belts for fixed sheaves or single-speed drives is similar, but not as severe. V-belts for VST generally need to be relatively wider and thinner than V-belts for fixed drives in order to accommodate a range of movement radially inward and outward in the variable sheaves. The resulting relatively wide aspect ratio of VST belts makes transverse stiffness more difficult to achieve, especially with the shifting movements placing increased transverse loads on the belt. On the other hand, since V-belts in fixed drives need not move in or out, the aspect ratio of the belt can be such that sufficient transverse stiffness is more easily achieved. Thus, while the use of cogs or notches is common to both fixed- and variable-speed V-belts, a fixed-speed V-belt cog design may not perform well in a VST.

Representative of the art is U.S. Pat. No. 4,276,039 which discloses a double-cogged V-belt for fixed drive with aligned upper and lower cogs. Such early designs have become disfavored because of perceived problems caused by alignment of the cogs and particularly alignment of the roots. Alignment of the upper and lower roots creates relatively thin web sections between the cogs where bending stresses may be highly concentrated and where bending radii can become very small. This results in cracking of the belt body in the root areas, cord fatigue and early failure. U.S. Pat. No. 4,276,039 applies a canvas cover over both lower and upper belt surfaces to help prevent cracking.

Also representative of the art is U.S. Pat. No. 4,708,703, which discloses a V-belt for a VST with aligned upper and lower teeth and grooves. The teeth are preferably covered at their tops with a reinforcing and stiffening element to deal with the problem of buckling.

The art contains many attempts to optimize the profile, including the shape, pitch, depth, alignment, and the like, of the upper and lower cogs of double-cogged V-belts. U.S. Pat. No. 6,620,068 discloses a raw-edge double-cogged V-belt for variable speed drives having curvilinear cogs on the inside and outside. The number of outside cogs are twice the number of and aligned with the inside cogs. JP 2002-089631A discloses a dual cog V-belt with more upper cogs than lower cogs, but less than twice as many so that the alignment or phase of the upper and lower cogs is variable.

A number of patents teach that the upper and lower cogs should be staggered, i.e., exactly 180° out of phase and of equal pitch or number. U.S. Pat. No. 1,890,080 discloses staggered rounded cogs of equal size and shape. U.S. Pat. No. 2,699,685 discloses staggered blocky-shaped cogs of equal size and shape with the grooves of one section vertically opposite the cogs of the other section in order to avoid weak spots and so that the thickness of the belt is the same all over.

JP 2002-031192A discloses a variation on a staggered double-cogged V-belt for VST applications wherein equal-numbered upper and lower cogs are not exactly in phase or out of phase, but phase shifted an amount somewhere in between, preferably from a tenth to half of the pitch. That publication teaches that lower and upper cog parts should not align or correspond so the belt thickness does not get extremely small thus preventing stress concentration and early crack initiation in that region. Finite element method ("FEM") analysis was apparently used to design an improved phase-shifted staggered profile and to confirm this effect. Increased phase shift up to half a pitch resulted in reduced root cracking.

In designs such as disclosed in JP 2002-031192A and JP 2002-089631A in which there are more upper cogs than lower cogs, the alignment of the upper and lower cogs is variable. In such a design, unequal pitches results in a "weak link" at the position around the belt where the upper and lower roots are most closely aligned. Root cracking may be observed to begin at this aligned root position. Even so, this design seems to be the most optimized design in the current market for double-cogged variable-speed V-belts.

Reference is made to co-pending U.S. patent application Ser. No. 12/217,026 filed Jul. 1, 2008, the contents of which are incorporated herein by reference in their entirety.

SUMMARY

The present invention is directed to systems and methods which provide improved double-cogged V-belts, or provides improved double-cogged V-belts for variable-speed drives.

The present invention is directed to a double-cogged V-belt with the upper and lower cog profiles symmetric and having lines ("L") and arcs ("A") connected according to a sequence beginning from the center of a root and extending to the center of an adjacent cog, the sequence being L1-A1-L2-A2-L3 for the upper profile and L4-A3-L5-A4-L6 for the lower profile, and with the sum of the length of L1 plus the radius of A1 equal to or within 20% of the sum of the length of L4 plus the radius of A3, and with at least one upper root and one lower root substantially aligned with each other.

In one embodiment the upper and lower pitches may be equal and all the roots substantially aligned. In another embodiment there may be more upper cogs than lower cogs. The ratio of the number of upper to lower cogs may be up to 1.3, or from 1.1 to 1.3.

In yet another embodiment, L4 has zero length, so that the lower profile has the sequence ALAL. In variations of this embodiment, the upper and lower pitches may be equal and all the roots substantially aligned, or there may be more upper cogs than lower cogs.

In various embodiments, some or all arcs and lines may be connected tangentially. For example, lines L1 and L2 may connect tangentially with arc A1, and said lines L4 and L5 may connect tangentially with arc A3. Preferably L1, L3, L4, and L6 connect tangentially with their mirror images at the centers of the roots and centers of the cog tips, so that the roots and tips are flat and smooth.

In various embodiments, the flanks of the cogs may be at an angle so that the included angle between opposing cog flanks is in the range of from about 10 to about 30 degrees.

Embodiments of the invention are particularly suited to V-belts for variable speed transmissions when the top width of the belt is about twice the overall thickness of the belt. It may also be advantageous for the pulley contact faces of the V-belt to have a first planar surface disposed at a first angle for engaging a sheave and a cooperating second planar surface disposed at a second angle that does not engage with a sheave surface.

The inventive belt exhibits various advantages over prior art double-cogged V-belt designs. Flexibility is improved without significantly increasing susceptibility to root cracking, and improved crack resistance is seen in the lower cog roots especially. Consistency of performance is improved.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings:

FIG. 6 illustrates the cog profile nomenclature system as applied to a third embodiment of the invention;

FIG. 7 illustrates the cog profile nomenclature system as applied to a prior art cog profile;

FIG. 8 illustrates the cog profile nomenclature system as applied to another prior art cog profile.

DETAILED DESCRIPTION

Figure 1:
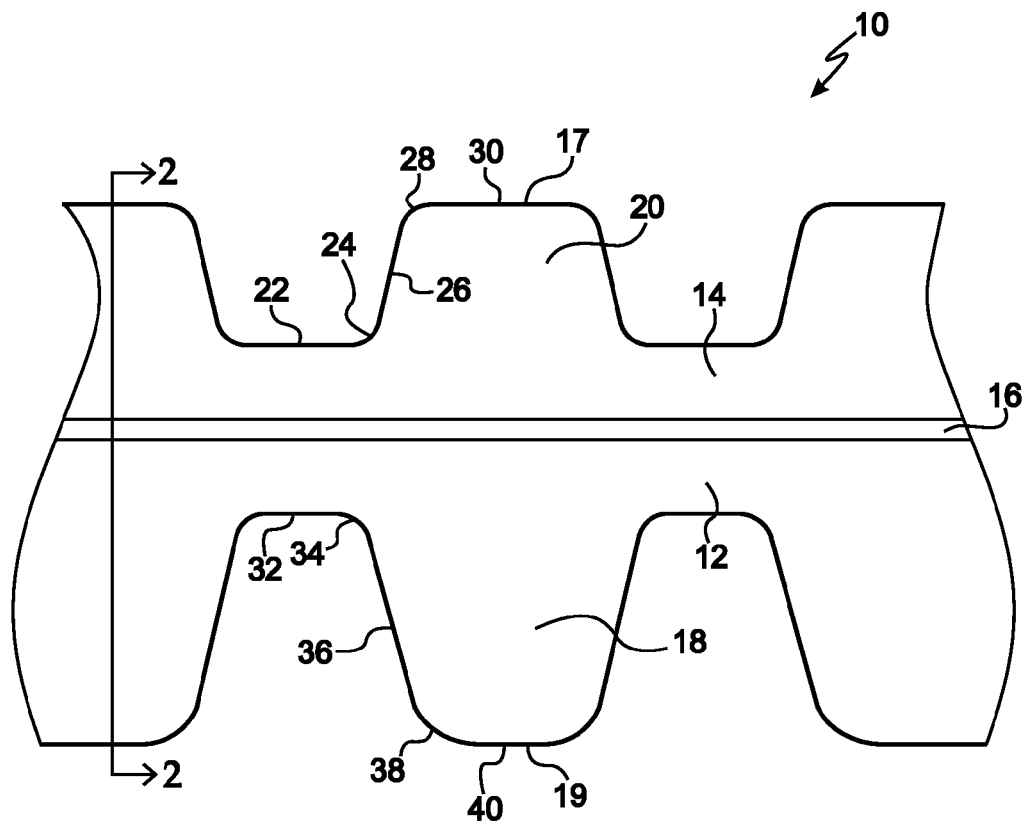
FIG. 1 is a partial side view of an embodiment of the invention.

To achieve maximum performance, efficiency, and durability in a VST, the belt has to be designed with high flexibility but high transversal stiffness while maintaining proper side contact and low stress concentration. To satisfy these special requirements at some level, a V-belt may be adapted with a single set of lower cogs on the inside 40 of the belt. In a VST application requiring higher transmitting power, a double cogged V-belt design, in which additional cogs are added on the upper or back side 30 of a belt, may be used to further increase transversal stiffness while still maintaining high flexibility and suitable contact area. For both designs of single cog and double cog VST belts, optimal geometries of cog profiles and cord position are crucial but not easily discovered, as indicated by the large number of proposals found in the art.

Usually, the profile of each cog is symmetric about the cog center and is a combination of straight line segments and arcs. A nomenclature system is used herein and in the claims to help identify and categorize profiles found in the art and embodiments of the present invention. In this system "A" represents an arc that is a component of a profile and "L" represents a line. If adjacent arcs and/or lines are connected, but not tangentially connected, a "+" sign is used to indicate the connection. Another way to describe non-tangentially connected arc and/or line segments is that the first derivative is not continuous at the point of connection. If two adjacent arc and/or line segments are connected tangentially in a cog profile, then no sign is used between the two letters designating those segments in the nomenclature system used herein. A sequence numeral may be used in association with the letters L and/or A to differentiate a number of lines or arcs in a sequence defining a given profile. For example, "L1" may refer to the first line segment in a profile, and depending on the context, "L1" may also refer to the length of that line segment. Likewise, "A1" may refer to the first arc in a sequence representing a profile, and "R1" may refer to the radius of that arc. For symmetric profiles, only half a repeating unit need be described as the other half is a mirror image of the first half. In the system used herein, the profile description will begin with a root center and end with a cog tip center. Other features of the nomenclature system will be described as needed below.

The invention is directed to double-cogged V-belts with an upper cog profile having the sequence LALAL, and a lower cog profile also having the sequence LALAL. Thus, the root or valley, represented by the first L in both the upper and lower profile is substantially flat. Also the flank of the cog in both upper and lower profiles is flat and the tip of the cog in both upper and lower profiles is flat. Each flat portion is connected by an arc. By substantially "flat" is meant that the profile portion is straight when the belt is laid out flat, which is called the "rack" form of the profile. Thus, when placed in its natural state which may be a circular band configuration, a flat segment may actually follow the curvature of the cord line or the natural curvature of the belt. In general, all arcs and line segments must be of finite and non-zero radius and length, unless explicitly stated otherwise as a special case. If this condition is not met, then the profile should be represented otherwise according to the nomenclature convention used herein. The cogs are disposed along the entire length of the belt.

Figure 3:
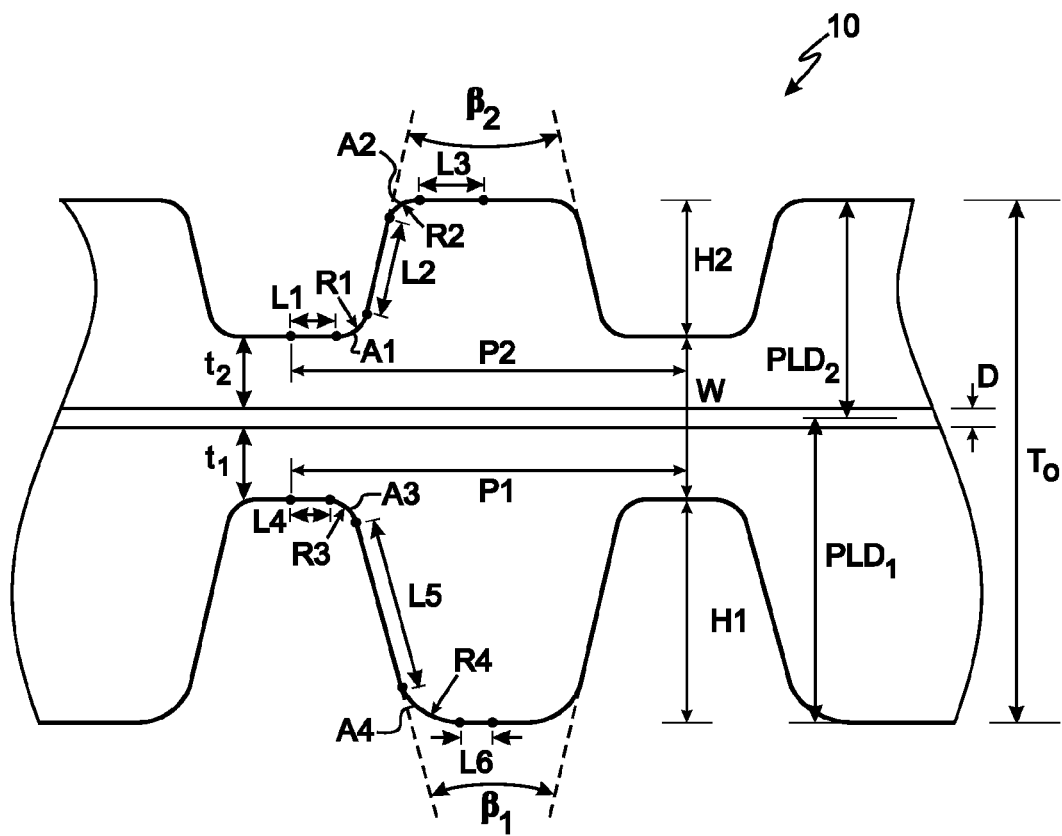
FIG. 3 another partial side view of the embodiment of FIG. 1.

It will be convenient to number the lines and arc of the profiles of the inventive belt. Thus, the upper cog profile may be represented with the sequence L1-A1-L2-A2-L3 from the center of a root to the center of an adjacent cog. Likewise, the lower cog profile may be represented with the sequence L4-A3-L5-A4-L6 from the center of a root to the center of an adjacent cog. The embodiment of FIG. 3 illustrates the location and connections between these arcs and lines forming the cog profiles of a double-cogged V-belt. The invention is directed to such double-cogged V-belts with at least one upper root aligned with at least one corresponding lower root. Also, in the inventive belts, the sum of the length of L1 plus the radius of A1 is equal to or within 20% of the sum of the length of L4 plus the radius of A3. One specific exception to the rule that all arcs and line segments must be of finite and non-zero radius and length, is that in various embodiments, L4 may be of zero length. Another specific exception to the same rule is that L2 may be of zero length in specific embodiments.

Detailed features of the invention and characteristics of embodiments of the invention may be defined and illustrated with reference to FIG. 1, FIG. 2, and FIG. 3. Referring to FIG. 1, double-cogged V-belt 10 includes tensile layer 16 sandwiched between overcord layer 14 and undercord layer 12 making up the main body of the belt. The double-cogged V-belt shown in FIGS. 1-3 also has lower cogs 18 and upper cogs 20 protruding from the main belt body. Upper cogs 20 include tip 17, flank 26 and valley or root 22. Likewise lower cogs 18 include tip 19, flank 36 and root 32. The double-cogged V-belt of FIG. 1 and FIG. 3 is drawn in rack form, i.e., flat and without curvature of the tensile layer.

Figure 2:
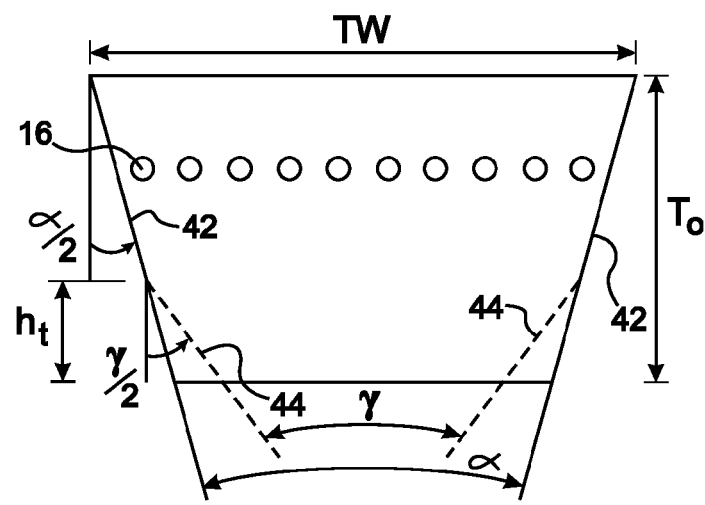
FIG. 2 is a cross sectional view along line 2-2 of FIG. 1.

FIG. 2 shows a section of the V-belt of FIG. 1, cut along the line 2-2 in FIG. 1. The overall belt width is called the top width and identified as "TW". The overall thickness of the belt is identified as "$T_0$". The pulley contact faces or side surfaces 42 of the V-belt are cut at an angle $\alpha/2$ with respect to the vertical axis of the belt, which should generally coincide with the vertical axis of a pulley or drive system. Thus, a pair of opposing belt side surfaces 42 describe an included angle $\alpha$. Each side surface 42 engages a sheave during operation, with the sheave angles also substantially equal to $\alpha/2$.

In embodiments of the invention, it may be advantageous for each cog to further include an opposing pair of second side surfaces 44 which are disposed toward a lower cog tip 19 and which are cooperating with the first side surfaces 42. Each pair of second side surfaces 44 describes an included angle $\gamma$. Angle $\alpha$ may be in the range of approximately 15° to 50° (so about 7° to about 25° per pulley sheave angle). Angle $\gamma$ may be in the range of approximately 25° to 65°. Namely, $\gamma = \alpha + (2 \times$ relief angle). The "relief angle" may be equal to or greater than approximately 5° and may be defined as $(\gamma/2 - \alpha/2)$. It is believed the cooperating nature of the first side surfaces and second side surfaces results in a significant reduction in noise generated by the belt during operation. All numeric values used in this specification to describe the invention are examples only and are not intended to limit the breadth or applicability of the invention unless otherwise stated. By way of example, the second side surface 44 may comprise a relief angle of approximately 5° which prevents the second side surface 44 from coming in contact with a sheave. Assuming an angle $\alpha$ of 20°, this gives an angle $\gamma$ of 30°. The cog tip cut height, ("$h_t$") in FIG. 2, may be adjusted as needed, for example, it may be about 1 to 2 mm.

FIG. 3 identifies additional dimensional characteristics of double-cogged V-belt 10. The tensile layer thickness, or tensile cord diameter, may be identified as "D". The thickness of the overcord layer is $t_2$ and the thickness of the undercord layer is $t_1$. The distance from the upper cog tip to the center of the tensile layer is identified as "$PLD_2$", and the distance from the lower cog tip to the center of the tensile layer is identified as "$PLD_1$". PLD stands for pitch line differential and is based on a common simplifying assumption that the belt's neutral axis in bending, i.e., its pitch line, occurs at the center of the tensile layer. The web thickness "W" is the distance between an upper root and lower root that are aligned. The depth of an upper root, or equivalently the height of an upper cog, is identified as "H2", and the depth of a lower root, or equivalently the height of a lower cog, is identified as "H1". The pitch, i.e., the profile repeat distance, is identified as the distance between two adjacent roots, which is "P2" for the upper profile and "P1" for the lower profile. The lines and arcs making up the profile were introduced previously. The lines "L2" making up the opposing flanks of an upper cog form an included angle "$\beta_2$". The lines "L5" making up the opposing flanks of a lower cog form an included angle "$\beta_1$". Other features and/or relationships between features may be self-evident from the figures. For example, $T_0 = PLD_1 + PLD_2 = H1 + H2 + W$. Also, $W = t_1 + D + t_2$.

In various embodiments, L4 may have zero length, so that the lower profile has the sequence ALAL. In variations of this embodiment, the upper and lower pitches may be equal and all the roots substantially aligned, or there may be more upper cogs than lower cogs. These embodiments will be described in more detail later.

In various embodiments, some or all arcs and lines may be connected tangentially or at least in a smooth transition. Preferably L1, L3, L4, and L6 connect tangentially with their mirror images at the centers of the roots and centers of the cog tips, so that the roots and tips are flat and smooth. Also preferably, lines L1 and L2 may connect tangentially with arc A1 (24 in FIG. 1), and/or said lines L4 and L5 may connect tangentially with arc A3 (34 in FIG. 1). These connections between the roots and flanks of the cogs are particularly important because of the stress concentrations that occur there during operation of the belt.

On the other hand, the stresses at the tips of the cogs, including in the neighborhood of A2 (28 in FIG. 1), L3, A4 (38 in FIG. 1) and L6, are generally of much less importance to belt life which is associated with cog root crack, therefore in embodiments of the invention, L2 and L3 need not connect tangentially with A2, L5 and L6 need not connect tangentially with A4, and R2 may be made as small as possible to maximize the size of the cogs tips and thereby maximize the transverse stiffening effect of the cogs on the belt. Still, R2 and R4 should be finite, making the cog tips at least slightly rounded, in order to avoid manufacturing issues due to sharp corners or non-smooth transitions.

In various embodiments, the included angle between opposing cog flanks may be in the range of from about 10 to about 30 degrees. Either or both included angles, $\beta_1$ and/or $\beta_2$, may be in the range of 10 to 30 degrees.

Embodiments of the invention are particularly suited to V-belts for variable speed transmissions when the top width of the belt is about twice the overall thickness of the belt. For single-speed V-belts, the ratio of top width to overall thickness may be closer to unity. The invention is not particularly limited in applicability, although it is thought to be of particular utility for VST belts.

A description of three preferred embodiments and a number of additional features which may be found in one or more of the preferred embodiments follows.

Figures 4, 5:
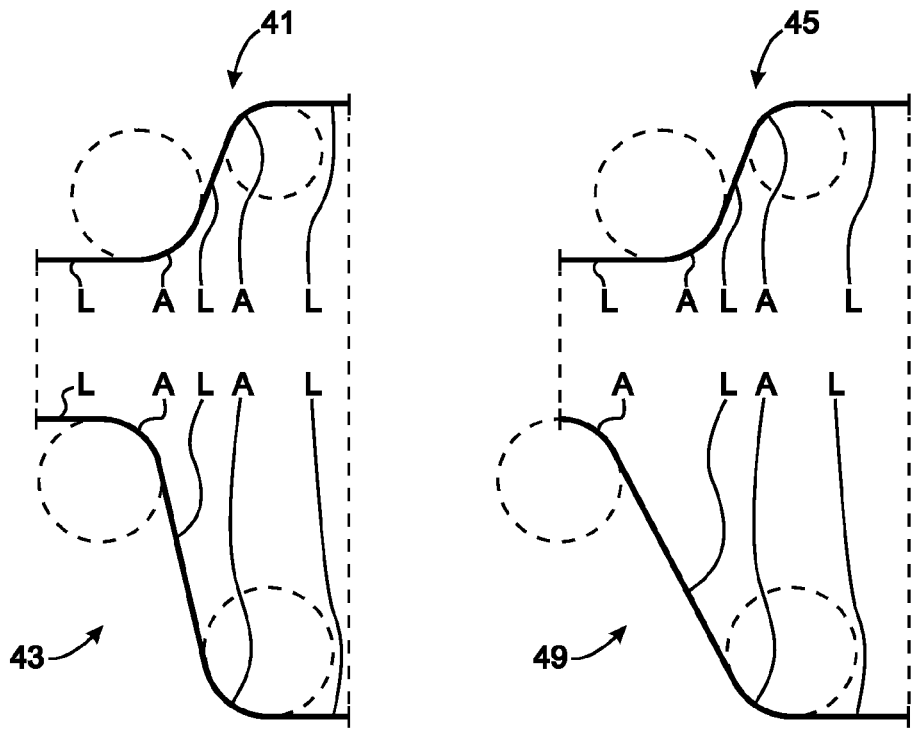
FIG. 4 illustrates a cog profile nomenclature system as applied to the embodiment of FIG. 1.
FIG. 5 illustrates the cog profile nomenclature system as applied to a second embodiment of the invention.

As mentioned above, the invention is directed to double-cogged V-belts with LALAL-type upper and lower profiles. Such a profile is illustrated in FIG. 4, which shows upper profile 41 including sequence LALAL, and lower profile 43 also including sequence LALAL. At least one upper root is aligned with at least one corresponding lower root as also shown in FIG. 4. Also, in the inventive profiles the sum of the length of L1 plus the radius of A1 is equal to or within 20% of the sum of the length of L4 plus the radius of A3, i.e., $0.8 \leq (L1+R1)/(L4+R3) \leq 1.2$. This sum is an approximation of the width of the root, or the distance between adjacent cogs near the base of the cogs. When the upper and lower cogs have similar spacing, i.e., upper and lower root widths are within about 20% of each other, and when at least one pair of roots are aligned and the roots have linear or flat portions, then the belt will be flexible. It is believed that flexibility is the primary or first consideration to address in designing a long life, high performance VST belt. This is in contrast to teaching in the art that root alignment is not desirable. Another advantage of the roots having linear or flat portions is that alignment is easier to achieve during belt manufacture. The wider the root, the more forgiving the manufacturing process will be in terms of root alignment and obtaining the resulting benefits in flexibility. Thus, the substantial alignment of the upper and lower roots may not or need not necessarily be perfect. It may be sufficient for the linear or flat portions of the upper and lower roots to overlap somewhat in embodiments of the invention. In contrast, very narrow, curved roots must be precisely aligned to realize any benefit in flexibility, leading to manufacturing problems.

In a first more specific embodiment of the above invention, the roots of the lower profile have no flat portion. In other words, L4=0, or equivalently, the lower cog profile is of the sequence ALAL. In this embodiment, the alignment of a lower and upper root is still relatively easy to achieve, since the midpoint of the lower root need only be aligned somewhere within the linear or flat portion L1 of the upper root. Such a profile is illustrated in FIG. 5, which shows upper profile 45 including sequence LALAL, and lower profile 49 including sequence ALAL. Again, at least one upper root is aligned with at least one corresponding lower root.

In a second more specific embodiment of the invention the belt has equal numbers of upper and lower cogs. In other words, P1 and P2 are equal, when the belt is disposed in rack form. It should be understood that a belt wrapped around a sheave has compressed lower dimensions and expanded upper dimensions, so for convenience the belt is described herein in rack form. Since the number of upper cogs, N2 and the number of lower cogs N1 are equal and at least one set of roots are aligned, the entire upper and lower profiles are substantially aligned. Again, this is contrary to much recent teaching in the art. As discussed above, root-to-root alignment results in the most flexible belt design possible. Maintaining a flat or linear segment in the upper and lower root makes alignment easier during manufacture. In comparison to a staggered profile design as described in the background section above, the aligned design of the present invention is so much more flexible that the web thickness "W" can be increased somewhat if desired for example to increase transverse strength. Thus, though the belt portion where the roots are aligned may represent the "weak link" of the belt, it is believed that by aligning all the roots, the strength of the weak link can be improved along with the flexibility, resulting in an overall gain in performance. In addition, since the geometry is consistent from cog to cog, so is the deformation and load, and the performance and life of the belt is thus is improved. Moreover, the highest stress regions in conventional designs are associated with the inflexible cog-to-root aligned portions of the belt, which are completely eliminated in the root-to-root aligned embodiment.

In variations of the second specific embodiment, it may be desirable to limit L4 to zero length, or equivalently, the lower cog profile is of the sequence ALAL, as in the first specific embodiment above. When L4=0, it may also be desirable to further define the width of the upper root relative to the width of the lower root so that the sum of the length of L1 plus the radius of A1 is greater than or equal to and within about 20% of the radius of A3, i.e., $1.0 \leq (L1+R1)/R3 \leq 1.2$. This latter limitation may prevent some difficulty aligning roots during manufacture.

In a third more specific embodiment of the invention the belt still has LALAL-type upper and lower profiles, and at least one upper root is aligned with at least one corresponding lower root, and the sum of the length of L1 plus the radius of A1 is equal to or within 20% of the sum of the length of L4 plus the radius of A3. However, in this third embodiment, the belt has a greater number of upper cogs than lower cogs. In other words, P1>P2, when the belt is disposed in rack form. Such a profile is illustrated in FIG. 6, which shows upper profile 46 including sequence LALAL, and lower profile 47 including sequence ALAL. Since only half a pitch is shown, the pitches and the phase shift, "ΔP", are indicated as divided by 2. The ratio of N2 to N1 is not particularly limited but may preferably be in the range 1.0 to 1.3 or from about 1.1 to about 1.3. Since the number of upper cogs, N2 and the number of lower cogs N1 are not equal, but at least one set of roots are aligned, not the entire upper and lower profiles will be substantially aligned. However, with the upper roots having some linear or flat width, and with N2 not too much larger than N1, there may still be a substantial number of cogs that are substantially aligned. Moreover, the inventive profile shape is improved and therefore, belts of this embodiment are believed to still exhibit enhanced flexibility and performance over other conventional profile designs. It should be understood that the lower cog profile could be of the LALAL type, though the example of FIG. 6 shows it of the ALAL type. This embodiment may encounter lower manufacturing costs as a result of the pitch difference and resulting less-critical alignment of profiles.

It should be understood, that one or more of the features mentioned earlier may also be found in variations of the invention according to any of the three specific embodiments described herein. This includes without limitation the included angle of the cog flanks, the relative top width and overall thickness, the relief angle cut in the contact faces, and the various smooth connections of the profile arcs and lines.

Figure 10:
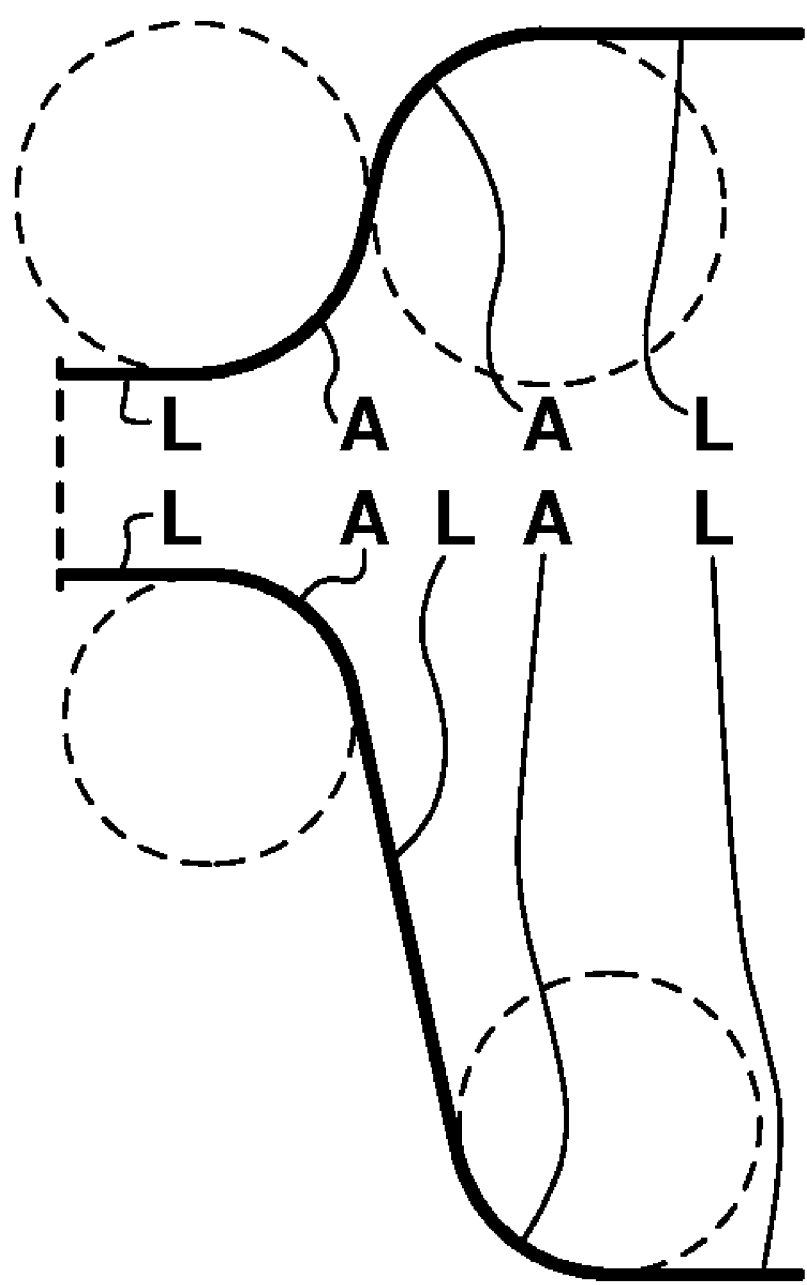
FIG. 10 illustrates the cog profile nomenclature system as applied to a fourth embodiment of the invention.

In various embodiments, it may also be useful to permit L2 to be of zero length, so that the upper profile is of the type LAAL, as illustrated in FIG. 10. This fourth embodiment may be useful in belts in which it is desired to make the upper cogs relatively short, i.e. H2 is relatively small.

V-belts according to the present invention may comprise any suitable material or materials. The following material examples are offered by way of example and are not intended to limit the breadth or applicability of the invention. Tensile layer 16 may have individual twisted cords of high tensile fibers such as glass, carbon, metal, polyester, nylon, aramid (including PBO), and blends or composites of the foregoing and the like. The tensile layer may be woven, fabric, tire cord, or the like as desired. The belt body may be of any desired composition, but exemplary materials are rubber compounds based on elastomers such as natural rubber, polychloroprene, polyisoprene, styrene-butadiene rubber, ethylene-alpha-olefin elastomers, nitrile rubber, polyurethane elastomer, various thermoplastic elastomers, and the like. These elastomers may be compounded as known in the art with various fillers, short fiber fillers, plasticizers, oils, process aids, anti-oxidants, anti-ozonants, curatives, coagents, and the like. Other reinforcing layers may incorporated into the belt besides the tensile layer, such as other textile layers which may woven, non-woven, knit, or discontinuous fiber layers, oriented or not oriented as known in the art. For example, textile layers may be used at any surface of the belt for example to modify the surface properties, strengthen the resistance to crack formation and/or propagation, or the like.

The invention may be made according to known methods of belt making, including for example, building up the various layers of textiles, elastomers, and tensile members, upright or inverted, on a cylindrical mold or on a mandrel for transfer to a mold. The mold may have the cog profile formed therein and/or so-called "matrix" may be used to produce a cog profile. After curing or vulcanization to form a double cogged slab, individual belts may be cut and/or ground therefrom with the proper contact surface angle or angles and inverted if necessary.

The following examples serve to illustrate the advantages of the inventive double-cogged V-belt design over representative other designs found in the art. In the examples, finite element analysis ("FEA") was used to compare various belt designs. In each case the same material properties for the belt body material (a typical elastomer compound) and the tensile layer (a typical aramid tensile cord) were used, so the differences in results would be solely attributable to the profile design differences. The FEA modeling included running four models for each belt example to simulate various operational conditions a VST belt sees: a belt bending model, a tension model, an underdrive model, and an overdrive model. The bending model started with ⅛ length of belt in a 45° arc as its natural molded shape, then rotated one end an additional 180°, ending in a 225° arc. The tension model started with the same 100 mm length of belt in a 90° arc and pulled it straight. The overdrive model simulated tensioning the belt between two sheaves by applying a hub load of 1000 N, at sheave diameters representing a high speed ratio, then rotated the driver sheave with 30 Nm of torque on the driven sheave. The underdrive model simulated tensioning the belt between two sheaves by applying a hub load of 1000 N, at sheave diameters representing a low speed ratio, then rotated the driver sheave with 30 Nm of torque on the driven sheave.

The dimensions and characteristics of the example belts (Ex. A and Ex. B) are shown in Tables 1-3, along with data for four comparative examples (Comp. Ex. 1-4). Table 1 shows the upper cog profile data, Table 2 shows the lower cog profile data, and Table 3 shows additional general belt geometry data. Ex. A is an embodiment of the current invention having upper profile of type LALAL and lower profile of type ALAL, with equal numbers of upper and lower cogs and the profiles aligned root-to-root. Ex. B is an embodiment of the current invention having the same lower cog profile as Ex. A, but the upper profile has more cogs than the lower profile. Both examples have L4=0 according to an embodiment of the invention. None of the examples or comparative examples have a relief angle as described herein.

Figure 9:
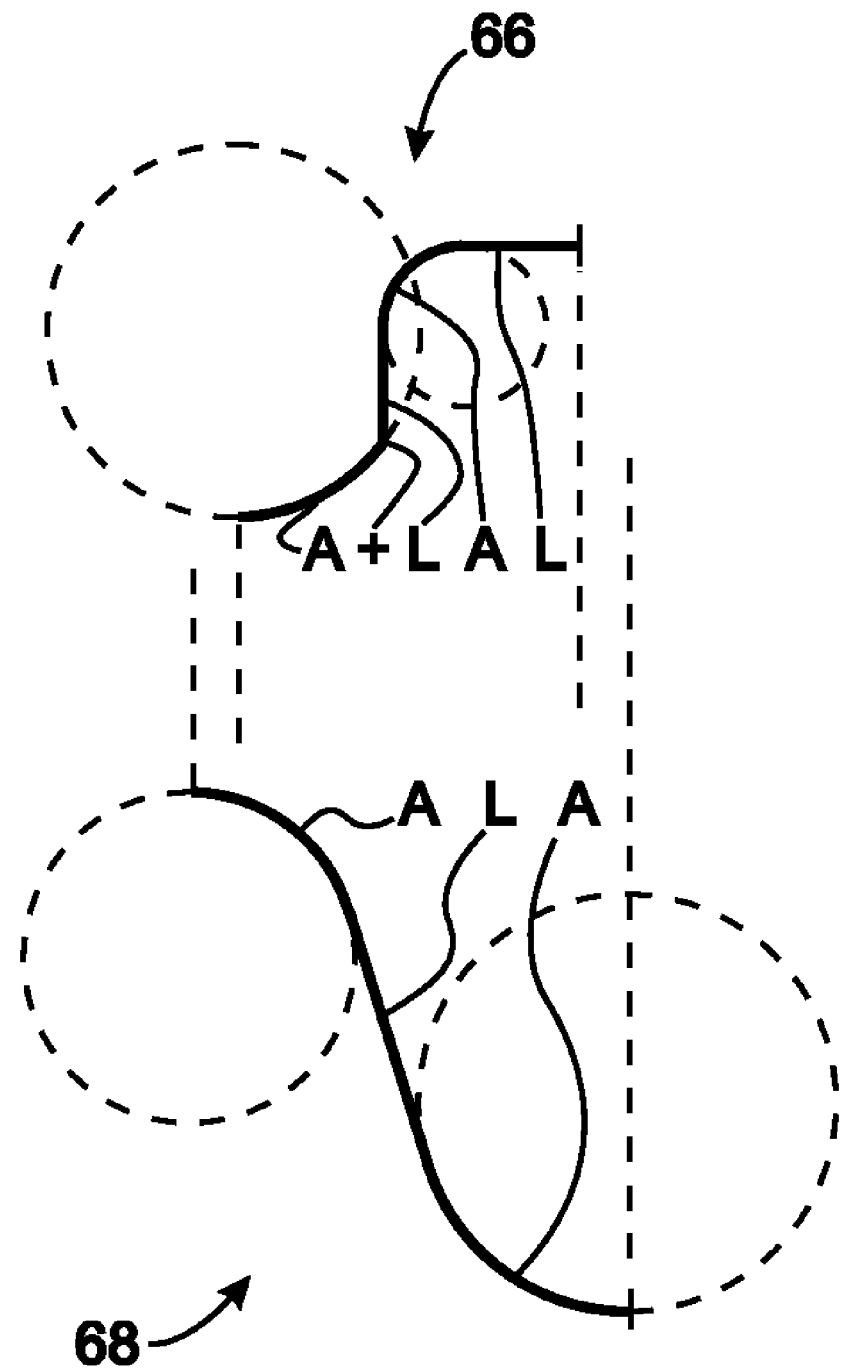
FIG. 9 illustrates the cog profile nomenclature system as applied to another prior art cog profile.

The comparative examples are based on V-belts for VST applications found in the market currently. The cog profiles for Comp. Ex. 1 are shown in FIG. 9, where upper profile 66 is of type A+LAL, and lower profile 68 is of type ALA. The cog profiles for Comp. Ex. 2 are shown in FIG. 7, where upper profile 62 is of type AAL and lower profile 60 is of type ALA. The cog profiles for Comp. Ex. 3 are shown in FIG. 8, where upper profile 54 is of type A+A and lower profile 56 is of type AL+A. The cog profiles for Comp. Ex. 4 are not specifically shown in a separate figure but are of previously illustrated types. FIG. 7-9 illustrate lack of root-to-root alignment in the comparative examples, for example by phase difference 64 in FIG. 7 and phase difference 58 in FIG. 8. Also, note the sharp profile breaks where arcs and/or lines do not meet smoothly or tangentially, for example at points 50 and 52 in FIG. 8.

TABLE 1

| Upper Cog Profile | Ex. A | Ex. B | Comp. Ex. 1 | Comp. Ex. 2 | Comp. Ex. 3 | Comp. Ex. 4 |
|---|---|---|---|---|---|---|
| upper profile type | LALAL | LALAL | A + LAL | AAL | A + A | A + A |
| L1 (mm) | 0.75 | 0.5 | 0 | 0 | 0 | 0 |
| R1 (mm) | 1.5 | 1.5 | 2.04 | 2.46 | 1.45 | 1.45 |
| A1 (degrees) | 78 | 78 | 49.5 | 90 | 69.082 | 69.777 |
| L2 (mm) | 1.86 | 18.2 | 1.608 | 0 | 0 | 0 |
| β2 (deg.) | 24 | 24 | 23 | 0 | 0 | 0 |
| R2 (mm) | 1 | 1 | 1.26 | 1.03 | 1.208 | 1.191 |
| A2 (degrees) | 78 | 78 | 78.5 | 90 | 90 | 90 |
| L3 (mm) | 2.178 | 1.239 | 1.762 | 1.352 | 0 | 0 |

TABLE 2

| Lower Cog Profile | Ex. A | Ex. B | Comp. Ex. 1 | Comp. Ex. 2 | Comp. Ex. 3 | Comp. Ex. 4 |
|---|---|---|---|---|---|---|
| lower profile type | ALAL | ALAL | ALA | ALA | AL + A | ALA |
| L4 (mm) | 0 | 0 | 0 | 0 | 0 | 0 |
| R3 (mm) | 2 | 2 | 1.92 | 2.19 | 1.98 | 2.51 |
| A3 (degrees) | 78 | 78 | 79.045 | 73.918 | 74 | 67.05 |
| L5 (mm) | 3.308 | 3.308 | 2.646 | 3.337 | 4.15 | 3.75 |
| β1 (deg.) | 24 | 24 | 21.91 | 32.184 | 32 | 45.9 |
| R4 (mm) | 2.5 | 2.5 | 3.17 | 2.78 | 3.22 | 2.32 |
| A4 (degrees) | 78 | 78 | 79.045 | 73.918 | 36.334 | 67.05 |
| L6 (mm) | 0.513 | 0.513 | 0 | 0 | 0 | 0 |

TABLE 3

| Belt Geometry | Ex. A | Ex. B | Comp. Ex. 1 | Comp. Ex. 2 | Comp. Ex. 3 | Comp. Ex. 4 |
|---|---|---|---|---|---|---|
| TW (mm) | 27 | 27 | 29.4 | 29.4 | 29.4 | 29.4 |
| $T_0$ (mm) | 14.6 | 14.6 | 14.5 | 14.5 | 14.5 | 14.5 |
| $PLD_2$ (mm) | 5.4 | 5.4 | 4.8 | 4.8 | 4.8 | 4.8 |
| $PLD_1$ (mm) | 9.2 | 9.2 | 9.7 | 9.7 | 9.7 | 9.7 |
| $t_2$ (mm) | 1.223 | 1.221 | 1.094 | 0.904 | 2.193 | 2.193 |
| $t_1$ (mm) | 1.8 | 1.8 | 2.379 | 2.291 | 3.069 | 2.681 |
| W (mm) | 4.003 | 4.001 | 4.453 | 4.175 | 6.242 | 5.854 |
| D (mm) | 0.98 | 0.98 | 0.98 | 0.98 | 0.98 | 0.98 |
| α (deg) | 28 | 28 | 28 | 28 | 28 | 28 |
| Belt Length (mm) | 911.1 | 911.1 | 876.3 | 872.7 | 874.8 | 871.2 |
| P1 (mm) | 11.206 | 11.206 | 11 | 11.4 | 9.91 | 11.82 |
| N1 (#) | 80 | 80 | 78 | 75 | 86 | 72 |
| P2 (mm) | 11.52 | 9.126 | 9.736 | 9.684 | 5.124 | 5.104 |
| N2 (#) | 80 | 101 | 91 | 91 | 174 | 174 |
| N2/N1 | 1.00 | 1.26 | 1.17 | 1.21 | 2.02 | 2.42 |
| (L1 + R1)/(L4 + R3) | 1.13 | 1.00 | 1.06 | 1.12 | 0.73 | 0.58 |
| $TW/T_0$ | 1.85 | 1.85 | 2.03 | 2.03 | 2.03 | 2.03 |

The results of the FEA models are shown in Table 4. In Table 4, two columns of results are presented for Ex. B. Since Ex. B has more upper cogs than lower cogs, the model predictions for both the aligned portion of the profile and the staggered or non-aligned portion of the profile are presented. The column labeled Ex. B-1 provides results for the aligned, root-to-root portion of the belt, while the column labeled Ex. B-1 provides results for the case where a root and a cog are aligned. Since the bending model involves a whole section of belt with both types of alignment included, only one result is presented. Results for the tension model are not separately provided since the peak stresses are in the tensile cord layer, and the bending stresses are much less than in the bending model. For the comparative examples, which also would normally have both extremes, just the worst case result is presented. The results are presented as peak strain energy density ("SED") in the region of interest described in the table, namely cog root or cog tip. Also presented is the peak contact friction stress ("CFS") as described in the table. Table 4 presents both absolute values of the above and a relative value, i.e. percent difference ("Diff. (%)") based on the best of the four comparative examples which is indicated with a "B".

The FEA analyses also shows that the peak cog tip strain energy density, namely the SED, increases significantly in the Example belts relative to the comparative examples, by 16 to 21%. This is not necessarily bad, since cog tips are generally not prone to strain or stress-induced cracks. Instead, the increased tip stress may indicate that more of the load is being carried by the cog in accordance with one purpose of having cogs.

Thus, the present invention is shown to provide a double-cogged V-belt, in particular for VST applications, with improved flexibility, reduced tendency to develop root cracks, and improved performance consistency.

Although the present invention and its advantages have been described in detail, it should be understood that various changes, substitutions, and alterations can be made herein without departing from the spirit and scope of the invention as

TABLE 4

| | | Ex. A | Ex. B-1 | Ex. B-2 | Comp. Ex. 1 | Comp. Ex. 2 | Comp. Ex. 3 | Comp. Ex. 4 |
|---|---|---|---|---|---|---|---|---|
| | | | Bending stiffness | | | | | |
| | Stiffness (Nmm/deg) | 2 | 2.2 | | 3.3 | 3 | 5.3 | 4.7 |
| | Diff. (%) | −32 | −25 | | 11 | B | 44 | 37 |
| | | | Peak SED at Lower Cog Root | | | | | |
| Overdrive | SED (MPa) | 0.226 | 0.228 | 0.222 | 0.25 | 0.263 | 0.312 | 0.338 |
| | Diff. (%) | −9 | −9 | −11 | B | 5 | 25 | 35 |
| Underdrive | SED (MPa) | 0.399 | 0.404 | 0.439 | 0.454 | 0.485 | 0.554 | 0.597 |
| | Diff. (%) | −12 | −11 | −3 | B | 7 | 22 | 31 |
| | | | Peak SED at Lower Cog Tip | | | | | |
| Overdrive | SED (MPa) | 0.852 | 0.866 | 0.888 | 0.718 | 0.863 | 0.896 | 0.918 |
| | Diff. (%) | 19 | 21 | 24 | B | 20 | 25 | 28 |
| Underdrive | SED (MPa) | 0.534 | 0.53 | 0.563 | 0.457 | 0.543 | 0.632 | 0.669 |
| | Diff. (%) | 17 | 16 | 23 | B | 19 | 38 | 46 |
| | | | Peak SED at Upper Cog Root | | | | | |
| Overdrive | SED (MPa) | 0.03 | 0.033 | 0.027 | 0.029 | 0.023 | 0.048 | 0.052 |
| | Diff. (%) | 29 | 41 | 17 | 24 | B | 109 | 126 |
| Underdrive | SED (MPa) | 0.047 | 0.046 | 0.045 | 0.05 | 0.039 | 0.087 | 0.096 |
| | Diff. (%) | 22 | 18 | 15 | 30 | B | 123 | 146 |
| | | | Peak CFS at Lower Cog Root | | | | | |
| Overdrive | CFS (MPa) | 2.23 | 2.272 | 2.325 | 2.458 | 2.509 | 2.775 | 2.85 |
| | Diff. (%) | −9 | −8 | −5 | B | 2 | 13 | 16 |
| Underdrive | CFS (MPa) | 3.107 | 3.131 | 3.202 | 3.353 | 3.405 | 3.68 | 3.754 |
| | Diff. (%) | −7 | −7 | −5 | B | 2 | 10 | 12 |
| | | | Peak CFS at Lower Cog Tip | | | | | |
| Overdrive | CFS (MPa) | 3.853 | 3.875 | 3.917 | 3.814 | 4.033 | 3.743 | 4.145 |
| | Diff. (%) | 1 | 2 | 3 | B | 6 | B | 11 |
| Underdrive | CFS (MPa) | 3.091 | 3.084 | 3.161 | 3.061 | 3.269 | 3.312 | 3.653 |
| | Diff. (%) | 1 | 1 | 3 | B | 7 | 8 | 19 |

The FEA analyses on double-cogged variable speed transmission belts have confirmed that both exemplary embodiments of Ex. 1 and Ex. 2 are an improvement over the comparative examples. The bending stress results confirm that Ex. 1 and 2 have maximized flexibility, 32% and 25% better than the best comparative example, respectively. The SED results confirm a reduced peak stress in the lower cog roots under both overdrive and underdrive conditions, 3% to 12% better than the best comparative example. Likewise, the peak CFS level in the lower cog roots is significantly improved, from 7% to 9% less than the comparative examples. The upper cog roots show comparable SED levels to the comparative examples, but it should be noted that the absolute values of SED in the upper roots are already much lower than in the lower roots.

defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. The invention disclosed herein may suitably be practiced in the absence of any element that is not specifically disclosed herein.

What is claimed is:

1. A V-belt having a number of upper cogs and upper roots with upper pitch and upper curvilinear profile, a number of lower cogs and lower roots with lower pitch and lower curvilinear profile, and a reinforcing tensile layer substantially midway between the upper roots and the lower roots;
   with the upper profile symmetric and comprising lines ("L") and arcs ("A") connected according to the sequence L1-A1-L2-A2-L3 from the center of any of said upper roots to the center of an adjacent cog of said upper cogs;
   with the lower profile symmetric and comprising lines and arcs connected according to the sequence A3-L5-A4-L6 from the center of any of said lower roots to the center of an adjacent cog of said lower cogs; and
   with the sum of the length of L1 plus the radius of A1 equal to or within 20% of the radius of A3; and
   with at least one of said upper roots being substantially aligned with at least one of said lower roots; and
   with both side surfaces of the V-belt including both upper and lower cogs cut at an angle $\alpha/2$ with respect to the vertical axis of the belt, and with a in the range of approximately 15° to 50°.

2. The V-belt of claim 1 wherein said lines L1 and L2 connect tangentially with arc A1, and said line L5 connects tangentially with said arc A3.

3. The V-belt of claim 1 wherein the sum of the length of L1 plus the radius of A1 is equal to or within 20% greater than the radius of A3.

4. The V-belt of claim 1 wherein the included angle of the opposing flanks defined by L5 of a lower cog is in the range of 10 to 30 degrees, and the included angle of the opposing flanks defined by L2 of an upper cog is in the range of 10 to 30 degrees.

5. The V-belt of claim 1 wherein
   the number of upper cogs and lower cogs are equal, and
   the upper and lower profiles are substantially aligned root-to-root.

6. The V-belt of claim 5 wherein the sum of the length of L1 plus the radius of A1 is equal to or within 20% greater than the radius of A3.

7. The V-belt of claim 6 wherein said lines L1 and L2 connect tangentially with arc A1, and said line L5 connects tangentially with arc A3.

8. The V-belt of claim 7 wherein the included angle of the opposing flanks defined by L5 of a lower cog is in the range of 10 to 30 degrees, and the included angle of the opposing flanks defined by L2 of an upper cog is in the range of 10 to 30 degrees.

9. The V-belt of claim 8 wherein each adjacent arc and line of both the upper and the lower profile are connected tangentially.

10. The V-belt of claim 5 wherein the belt has a top width that is about twice the overall thickness.

11. The V-belt of claim 5 wherein each adjacent arc and line of both the upper and the lower profile connect tangentially.

12. The V-belt of claim 1 wherein the number of upper cogs is greater than the number of lower cogs.

13. The V-belt of claim 12 wherein the number of upper cogs is about 1.1 to 1.3 times the number of lower cogs.

14. The V-belt of claim 12 wherein said lines L1 and L2 connect tangentially with arc A1, and said line L5 connects tangentially with arc A3.

15. The V-belt of claim 12 wherein the included angle of the opposing flanks defined by L5 of a lower cog is in the range of 10 to 30 degrees, and the included angle of the opposing flanks defined by L2 of an upper cog is in the range of 10 to 30 degrees.

16. The V-belt of claim 12 wherein the belt has a top width that is about twice the overall thickness.

17. The V-belt of claim 12 wherein each adjacent arc and line of both the upper and the lower profile connect tangentially.

18. The V-belt of claim 1 further comprising opposing side surfaces having a relief angle disposed near a lower cog tip.

19. The V-belt of claim 1 wherein the belt has a top width that is about twice the overall thickness.

20. The V-belt of claim 1 wherein each adjacent arc and line of both the upper and the lower profile connect tangentially.

21. The V-belt of claim 1 wherein at least one of said arcs A1, A2, A3, and A4 has an arc radius of at least 1 mm.

22. The V-belt of claim 21 wherein each of said arcs A1, A2, A3, and A4 has an arc radius of at least 1 mm.

23. The V-belt of claim 1 wherein said upper cogs have an upper cog height H2, and said lower cogs have a lower cog height H1, such that H2 is less than H1.

24. The V-belt of claim 1 wherein the radius of said arc A1 is greater than the radius of said arc A2, and the radius of said arc A4 is greater than the radius of said arc A3.

25. The V-belt of claim 24 wherein each of said arcs A1, A2, A3, and A4 has an arc radius of at least 1 mm; and
   wherein said upper cogs have an upper cog height H2, and said lower cogs have a lower cog height H1, such that H2 is less than H1.

26. A V-belt having a number of upper cogs and upper roots with upper pitch and upper curvilinear profile, a number of lower cogs and lower roots with lower pitch and lower curvilinear profile, and a reinforcing tensile layer substantially midway between the upper roots and the lower roots;
   with the upper profile symmetric and comprising lines ("L") and arcs ("A") connected according to the sequence L1-A1-A2-L3 from the center of any of said upper roots to the center of an adjacent cog of said upper cogs;
   with the lower profile symmetric and comprising lines and arcs connected according to the sequence L4-A3-L5-A4-L6 from the center of any of said lower roots to the center of an adjacent cog of said lower cogs; and
   with the sum of the length of L1 plus the radius of A1 equal to or within 20% of the radius of A3; and
   with at least one of said upper roots being substantially aligned with at least one of said lower roots.

* * * * *